United States Patent Office 2,965,639
Patented Dec. 20, 1960

2,965,639

NEW BASICALLY SUBSTITUTED AZEPINE DERIVATIVES

Walter Schindler, Riehen, near Basel, and Franz Häfliger, Basel, Switzerland, assignors to Geigy Chemical Corporation, Ardsley, N.Y., a corporation of Delaware No Drawing. Filed June 23, 1959, Ser. No. 822,186

Claims priority, application Switzerland July 23, 1958

5 Claims. (Cl. 260—239)

The present invention concerns new, basically substituted azepine derivatives having valuable pharmacological properties, as well as processes for the production thereof.

It has been found that N-substituted azepine derivatives of the general formula

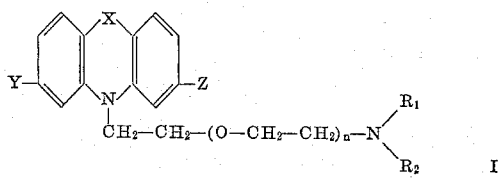

wherein
X represents a member selected from the group consisting of the ethylene —$CH_2$—$CH_2$— and the vinylene —CH=CH— radical,
Y and Z each represent a member selected from the group consisting of hydrogen and the chlorine atom,
$R_1$ and $R_2$ represent lower alkyl radicals, and $n$ represents a whole number from 1 to 2 have valuable pharmacological properties. They have, for example, anti-allergic activity, in particular antihistaminic activity, spasmolytic, serotonin antagonistic, anticonvulsive, anti-inflammatory and a sedative action, in particular they potentiate the action of anaesthetics. For example a daily dosage of 100–150 mg. in single dosage units of 25 mg. can be given perorally as antihistamines, for example for the treatment of hay fever, urticaria and asthma. Quaternary ammonium salts which are derived from the tertiary bases defined above, have a ganglion-blocking action.

The new compounds are produced by reacting, in the presence of an acid binding agent, an azepine derivative of the general formula

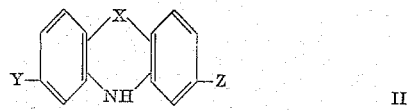

i.e. a possibly substituted 5-dibenzo[b.f]azepine or a 10.11-dihydro - 5 - dibenzo[b.f]azepine—which will be termed in the following as a possibly substituted iminostilbene or iminodibenzyl—with a reactive ester of an amino alcohol of the general formula

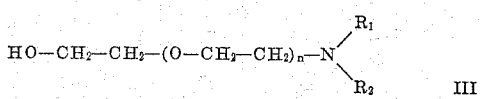

wherein X, Y, Z, $R_1$, $R_2$ and $n$ have the meanings given above.

Sodium amide, sodium hydride, lithium amide, potassium amide in particular as well as sodium, lithium and potassium themselves are suitable as acid binding agents. As reactive esters of amino alcohols, in particular the halides are used; individually can be named: dimethylaminoethoxy ethyl chloride, dimethylaminoethoxy ethoxy ethyl chloride, (1-dimethylamino - 8 - chloro-3.6-dioxaoctane), diethylaminoethoxyethyl chloride, diethylaminoethoxyethoxyethyl chloride, (1-diethylamino - 8 - chloro-3.6-dioxa-octane), di-n-propylamino-ethoxyethyl chloride or di-n-butylaminoethoxyethyl chloride as well as the corresponding bromides.

Suitable starting materials of the general formula II are for example, iminodibenzyl and iminostilbene as well as the mono- and di-substitution products thereof such as 3-ethyl-iminodibenzyl, 3 - ethyl-iminostilbene, 3.7-dimethyl-iminodibenzyl, 3.7-dichloro-iminodibenzyl and 3.7-dichloro-iminostilbene.

The new N-substituted azepine derivatives of the general formula I can also be produced by reacting, possibly in the presence of an acid binding agent, an azepine derivative of the general Formula II with phosgene, reacting the 5-chlorocarbonylazepine derivative obtained with an amino alcohol of the general Formula III and heating the 5-substituted azepine derivative obtained of the general formula

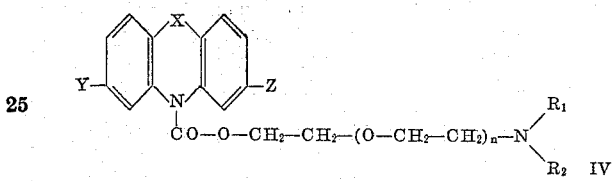

wherein X, Y, Z, $R_1$, $R_2$ and $n$ have the meanings given above, until carbon dioxide is split off.

The compounds of the general Formula I are also produced by a third process by reacting compounds of the general formula

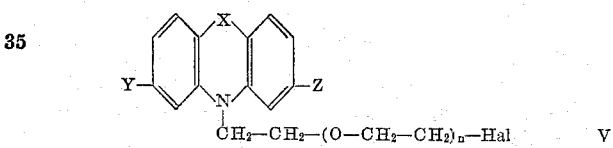

wherein Hal represents chlorine or bromine and X, Y, Z and $n$ have the meanings given above, with a secondary amine of the general formula

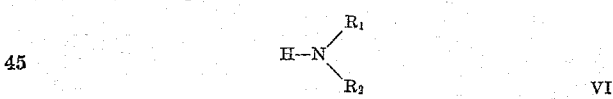

wherein $R_1$ and $R_2$ have the meanings given above, for example, with dimethylamine, diethylamine, di-n-propylamine or di-n-butylamine. Starting materials of the general Formula V are obtained, for example, by reacting halogen ethoxy ethanols or halogen ethoxyethoxy ethanols with compounds of the general Formula II analogously to the first production process followed by treatment of the hydroxyl-containing intermediate products obtained with inorganic acid halides such as thionyl chloride, phosphorus oxychloride or phosphorus tribromide; examples are 5-(β-chloroethoxyethyl)- and 5-(β-chlorethoxyethoxyethyl)-iminodibenzyl and -iminostilbene.

Finally, the compounds according to the present invention of the general Formula I are obtained by treating compounds of the general formula

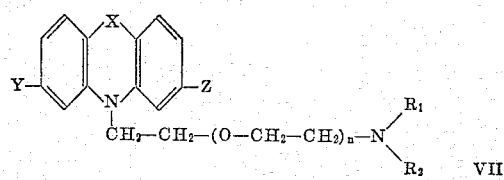

wherein $R_1$ represents a low molecular alkyl radical and X, Y, Z and $n$ have the meanings given above, with a low molecular alkylating agent. As such are used, for example, dimethyl sulphate, diethyl sulphate, methyl iodide, ethyl iodide, ethyl bromide, n-propyl bromide, n-butyl bromide and p-toluene sulphonic acid methyl ester in the presence of acid binding agents such as e.g. sodium or potassium carbonate and an inert organic solvent, also for example, formaldehyde is used in the presence of formic acid.

By the addition of halides or sulphates of aliphatic or araliphatic alcohols, e.g. of methyl iodide, dimethyl sulphate, ethyl bromide, ethyl iodide, allyl bromide, n-butyl bromide or benzyl chloride to the tertiary bases of the general Formula I, mono-quaternary ammonium compounds are formed in the usual manner; it is the tertiary amino group of the side chain which reacts.

The tertiary bases form salts with inorganic or organic acids such as hydrochloric acid, hydrobromic acid, sulphuric acid, phosphoric acid, methane sulphonic acid, ethane sulphonic acid, ethane disulphonic acid, acetic acid, succinic acid, fumaric acid, maleic acid, malic acid, tartaric acid, citric acid, benzoic acid, and phthalic acid. Some of these salts are water soluble.

The following examples further illustrate the production of the new compounds. Parts are given as parts by weight and their relationship to parts by volume is as that of grammes to cubic centimetres. The temperatures are given in degrees centigrade.

Example 1

19.5 parts of iminodibenzyl are dissolved in 50 parts by volume of abs. benzene and the benzene solution of the base from 30 parts of diethylaminoethoxyethyl chloride hydrochloride in 300 parts by volume of abs. benzene is added.

A suspension of 4.4 parts of sodium amide in toluene is added dropwise at 60–70° while stirring well and the whole is then refluxed for 16 hours. Water is then added to the reaction mixture and the basic portions are removed from the benzene phase by shaking out three times with diluted hydrochloric acid. The combined extracts are made alkaline and ethered out. The ethereal solution is dried over potassium carbonate and concentrated. The residue is distilled in a high vacuum, whereupon the 5-(diethylamino-ethoxy-ethyl)-iminodibenzyl passes over at 163° under 0.005 mm. pressure.

The hydrochloride prepared with alcoholic hydrochloric acid melts at 130–131° (from acetone).

If, instead of iminodibenzyl, 26.4 parts of 3.7-dichloro-iminodibenzyl are used, then 5 - (diethylamino-ethoxy-ethyl) - 3.7 - dichloro-iminodibenzyl is obtained in an analogous manner.

On the other hand, if the basic chloride is replaced by 30 parts of the base liberated from 30 parts of diethyl-aminoethoxy-ethoxy-ethyl chloride hydrochloride, then 5-(diethylamino-ethoxy-ethoxy-ethyl)-iminodibenzyl is obtained. B.P.$_{0.005}$ 170–171°.

Example 2

The base liberated from 17 parts of diethylamino ethoxy-ethyl chloride hydrochloride and 9.7 parts of iminostilbene are dissolved in 250 parts by volume of benzene. A suspension of 3 parts of sodium amide in toluene is added dropwise at 70° while stirring and the whole is then refluxed for 16 hours.

On proceeding as described in Example 1, the 5-(diethylamino-ethoxy - ethyl) - iminostilbene is obtained. B.P.$_{0.003}$ 163°.

The hydrochloride prepared with alcoholic hydrochloric acid melts at 167–167.5°.

5 - (diethylamino-ethoxy-ethoxy-ethyl)-iminostilbene, (B.P.$_{0.005}$ 195°) and 5 - dimethylamino-ethoxy-ethyl)-iminostilbene, (B.P.$_{0.005}$ 160°) are obtained in an analogous manner on using the corresponding basic chlorides.

Example 3

26.4 parts of dichloro-iminodibenzyl and the base liberated from 30 parts of diethylamino-ethoxy-ethoxy-ethyl chloride hydrochloride are dissolved in 300 parts by volume of abs. benzene and 4 parts of sodium amide suspended in toluene are added dropwise at 70° while stirring.

The reaction mixture is then refluxed for 16 hours. After cooling, water is added, the benzene solution is removed, dried and concentrated. The residue is boiled out with 200 parts by volume of ligroin, filtered cold and the filtrate is concentrated. The residue is distilled in a high vacuum whereupon 5-(diethylamino-ethoxy-ethoxy-ethyl)-3.7-dichloro-iminodibenzyl is obtained. It boils at 215° under 0.01 mm. pressure.

Example 4

19.5 parts of iminodibenzyl and the base liberated from 23 parts of dimethylamino-ethoxy-ethyl chloride hydrochloride are dissolved in 300 parts by volume of abs. benzene.

5 parts of sodium amide suspended in toluene are added dropwise at 70° while stirring well and the reaction mixture is then stirred for 16 hours at boiling temperature. After cooling, water is added and the benzene solution is extracted four times with 50 parts of 2 N-hydrochloric acid each time. The acid aqueous extracts are made alkaline and ethered out. The ether extract is dried, concentrated and the residue is distilled in a high vacuum, whereupon 5 - (dimethylamino-ethoxy-ethyl) - iminodibenzyl passes over at 175° under 0.03 mm. pressure.

5 - (dimethylamino-ethoxy-ethyl) - 3.7 - dichloro-iminodibenzyl (B.P.$_{0.005}$ 175°) is obtained in an analogous manner if, in the above example, 26.4 parts of 3.7-dichloro-iminodibenzyl is used instead of the iminodibenzyl.

5 - (dimethylaminoethoxy-ethoxyethyl) - 3 - chloro-iminodibenzyl, B.P.$_{0.02}$ 228–234°, can also be obtained in an analogous manner.

What we claim is:

1. Basically substituted azepine derivatives of the general formula

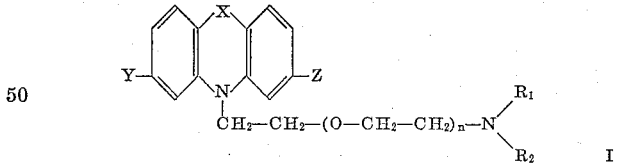

wherein

X represents a member selected from the group of the ethylene —CH$_2$—CH$_2$— and the vinylene

—CH=CH— radical,

Y and Z each represent a member selected from the group consisting of hydrogen and the chlorine atom, R$_1$ and R$_2$ represent lower alkyl radicals, and $n$ represents a whole number from 1 to 2.

2. 5 - (diethylamino-ethoxyethyl)-imino-dibenzyl.
3. 5-(diethylamino-ethoxyethyl)-iminostilbene.
4. 5-(dimethylamino-ethoxyethyl)-iminostilbene.
5. 5-(dimethylamino-ethoxyethyl)-iminodibenzyl.

No references cited.